US005592867A

United States Patent [19]

Walsh et al.

[11] Patent Number: 5,592,867

[45] Date of Patent: Jan. 14, 1997

[54] BEVERAGE DISPENSING SYSTEM

[75] Inventors: John J. Walsh, Wiltshire; Leigh D. Carter, Middlesex, both of Great Britain

[73] Assignee: Guiness Brewing Worldwide Limited, London, Great Britain

[21] Appl. No.: 405,834

[22] Filed: Mar. 17, 1995

[30] Foreign Application Priority Data

Mar. 29, 1994 [GB] United Kingdom ................... 9406172

[51] Int. Cl.[6] ........................................ A23L 2/26

[52] U.S. Cl. .................................... 99/323.2; 261/DIG. 7

[58] Field of Search ................................ 99/275, 323.1, 99/323.2, 323.3; 261/DIG. 7; 926/474, 477

[56] References Cited

U.S. PATENT DOCUMENTS 4,191,784 3/1980 Mojonnier ............................ 426/477
4,304,736 12/1981 Millin ............................ 261/DIG. 7
4,708,827 11/1987 McMillin ............................ 99/323.1
4,745,853 5/1988 Hoover ............................ 99/323.1
5,011,700 4/1991 Gustafson ............................ 426/477
5,021,250 6/1991 Ferguson ............................ 426/477

*Primary Examiner*—Robert W. Jenkins
*Attorney, Agent, or Firm*—McCormick, Paulding & Huber

[57] ABSTRACT

A carbonated beverage dispensing system includes a carbonation bowl 1 having a chamber 2 with a frusto conical upper part 4. Water is admitted to the chamber 2 as a mist through nozzle 7 and CO2 is admitted to the chamber through inlet 8 to provide a carbonated water reservoir. Carbonated water is driven under pressure of CO2 in the headspace of chamber 2 through a metering unit 42 and mixed at 27 with beverage syrup for dispensing through tap 29. When the dispense system is dormant a microprocessor 70 actuates pump 13 to introduce water which raises the level of the reservoir into the frusto conical part 4 so that the surface area of the reservoir exposed to the CO2 is reduced to alleviate excessive absorption of CO2 by the water in the reservoir. The system may be applied for post mix of carbonated water with beverage syrup or to pre-mix of beverage syrup with un-carbonated water and which mixture is subsequently carbonated.

In a modification the volume of the headspace above the reservoir may be increased without the admission of CO2 to reduce the gas pressure in the headspace during dormant periods.

21 Claims, 1 Drawing Sheet

BEVERAGE DISPENSING SYSTEM

TECHNICAL FIELD AND BACKGROUND ART

The present invention relates to a beverage dispensing system and is especially concerned with a system for dispensing carbonated beverage where carbonation is effected within the system by absorption of carbon dioxide (for convenience hereinafter referred to as CO2) within a liquid for the beverage.

Carbonated beverage dispensing systems are well known for dispensing on demand so-called soft drinks where the beverage is derived in the system by mixing beverage syrup or concentrate with water. Two such systems are known of which the preferred is a so-called "post mix" system where water is first subjected to CO2 gas and the resulting carbonated water mixed with the syrup as the beverage is dispensed. The second system is a so-called "pre-mix"system where water and syrup are first mixed to form uncarbonated beverage and such beverage is subjected to CO2 gas for dispensing as the carbonated beverage. Many beverages, typically soft drinks such as lemonade, colas and the like and fermented beverages such as beer, cider and the like, are carbonated to improve their flavour and mouth feel characteristics and also their aesthetic qualities such as sparkle and head or froth formation. It is recognised that to achieve their preferred characteristics, different beverages require different quantities of CO2 absorbed therein. Typically carbonated beer will have a CO2 content in the range of 4 to 4.4 grammes per liter (above this range it is likely that the liberation of CO2 from the beer during dispensing will create excessive and inconvenient frothing and below this range it is likely that the beer will be unacceptably flat) whereas lemonade and similar soft drinks will usually have far greater weights of CO2 absorbed per liter (usually they will have as much CO2 absorbed therein as is practical to provide excessive effervescence and sparkle). As a consequence of the aforegoing it has been found that known carbonation systems for dispensing beverage on demand are unsuitable for use with beverages when there is a requirement for a relatively low level and consistent content of absorbed CO2 to be maintained in the beverage as dispensed and it is an object of the present invention to provide a beverage dispensing system which satisfies this requirement.

STATEMENT OF INVENTION AND ADVANTAGES

According to the present invention there is provided a beverage dispensing system comprising a carbonation bowl chamber into which carbon dioxide (CO2) under pressure is introduced to provide a CO2 atmosphere and into which atmosphere and bowl chamber liquid for the beverage is introduced intermittently for carbonation to a CO2 absorption content less than a predetermined such content, carbonated liquid thereby provided in the bowl chamber forming a reservoir from which the carbonated liquid is drawn on demand for dispensing carbonated beverage and further forming a headspace containing CO2 under pressure from which headspace the reservoir of carbonated liquid absorbs further CO2, and wherein control means is provided for controlling the absorption, by the liquid in the reservoir of CO2 from said headspace during dormant periods of the system when carbonated liquid is not drawn from the bowl chamber to maintain, during said dormant periods, the carbonated liquid in the reservoir with a CO2 absorption content less than said predetermined absorption content.

Known carbonated beverage dispensing systems have a carbonation bowl chamber into which CO2 under pressure is introduced together with liquid for the beverage for such liquid to be carbonated and drawn from the carbonation bowl chamber for dispensing as, or with, carbonated beverage. Usually the dispensing will be effected through a closure valve or dispense tap so that on opening of the tap the carbonated liquid is dispensed as a result of its displacement under pressure by CO2 gas in the headspace of the bowl chamber. The liquid admitted to the bowl chamber for carbonation may be a mixture of water and a syrup or concentrate of the beverage (as in a pre-mix system) or may be water so that carbonated water drawn from the bowl chamber is mixed with a beverage syrup or concentrate for dispensing of carbonated beverage (as in a post-mix system). In known systems the admission of liquid to the bowl chamber and the admission of CO2 gas is controlled to try and achieve consistency in the CO2 absorption content of the liquid that is drawn from the bowl chamber in the sense that the CO2 absorption content should be greater than a predetermined minimum content—there is no difficulty in achieving this with liquid for use with lemonade and similar soft drinks (and also cider) where a maximum level of CO2 absorption is appropriate and even absorption levels well below the maximum are acceptable provided that the drinks are not likely to be regarded by the consumer as being flat. With such known systems the CO2 gas in the headspace of the bowl chamber is typically maintained in the order of 3.5 bar into which the liquid is jetted or sprayed. The bowl chamber acts as a reservoir of carbonated liquid and level switches in the bowl chamber actuate a control system so that liquid is admitted to the CO2 atmosphere in the bowl chamber to replenish the reservoir of carbonated liquid to a preset minimum level or some higher level if the level of the reservoir in the bowl chamber falls below that preset level. When such known systems are dormant and carbonated liquid is not being drawn from the bowl chamber, the surface of the liquid in that chamber is exposed to the pressurised CO2 in the bowl chamber headspace and as a result the liquid may continuously absorb CO2. The absorption of CO2 by the liquid in the bowl chamber when the system is dormant may be considerable, especially when the system is unused for long periods, say overnight or over a weekend. This latter absorption of CO2 is of little consequence for some liquids such as lemonade as aforementioned but is inappropriate for other liquids such as those classed as beer (either with normal, low or non alcoholic content) where a predetermined CO2 absorption content which may be far less than the maximum such content achievable is required for dispensing. By the present invention and during periods when the system is dormant, the control means acts to control or reduce the rate of absorption by the carbonated liquid in the bowl chamber of CO2 from the headspace of that chamber and alleviate the likelihood that the CO2 absorption content of the carbonated liquid in the reservoir will exceed a predetermined absorption content. With non-alcoholic lager such as that sold under the Trade Mark KALIBER by the Guinness Group of Companies and many other beers, the preferred maximum CO2 content is in the order of 4.4 grammes per liter and in such case the control means would act to alleviate absorption of CO2 by the liquid beyond this maximum so that when the beer is dispensed after a prolonged period (say overnight) it may be expected to present the required characteristics which result from its acceptable CO2 absorption content. With the aforementioned KALIBER and other beers, a minimum CO2 absorption content is likely to be 4 grammes per liter. With this in mind the system can be arranged so that the carbonation effected as a result of the liquid being introduced into the carbonation bowl chamber provides an absorbed CO2 content towards the bottom end of the range considered acceptable (to cover the possibility of continuous dispensing of the carbonated liquid as it is being formed) and the upper end of the range is thereby available to permit some absorption of CO2 from the headspace when the system is dormant and as determined by the control means.

Preferably the control means is actuated during dormant periods of the system to reduce the surface area of the carbonated liquid in the reservoir that is exposed to the CO2 in the headspace. It will be appreciated that as the surface area of the carbonated liquid in the bowl chamber that is exposed to the headspace of that chamber is reduced so will be reduced the rate at which the carbonated liquid absorbs further CO2 from the headspace. This reduction in the exposed surface area may simply be achieved by having a bowl chamber the horizontal cross sectional area of which reduces as it approaches an upper part of the bowl chamber and during the aforementioned periods when the system is dormant, the control means may introduce liquid into the bowl chamber to increase the volume of the reservoir and cause its surface to move upwardly within the reducing cross sectional area of the bowl chamber and thereby reduce its surface area that is exposed to the CO2 in the headspace. Less preferred but as an alternative to increasing the volume of liquid in the reservoir, the bowl chamber may be of a telescopic or piston-like structure so that the aforementioned reducing cross sectional area of the bowl chamber can be displaced by the control means relatively towards the bottom of the bowl chamber and cause the surface of the carbonated liquid in the bowl chamber to move into the reducing cross sectional area of the bowl chamber, thereby providing the effect of reducing the surface area of the reservoir that is exposed to the CO2 in the headspace. Desirably the horizontal cross sectional area of the bowl chamber is reduced by tapering that chamber to converge progressively as it approaches its top, for example by forming the bowl chamber with a frusto conical or frusto pyramidal upper or top portion.

It is not necessary for the control means to be actuated during each period when the system is dormant and a time control may be provided which actuates the control means to maintain the CO2 absorption content of the liquid less than the predetermined absorption content following a predetermined period commencing from when the system becomes dormant (which will usually be when carbonated liquid ceases to be withdrawn from the bowl chamber). For example, the time control may ensure that the control means is not actuated for say two minutes or more from the time at which the dispensing system becomes dormant, usually when a dispense tap is closed following beverage dispensing. This alleviates the likelihood of the control means being actuated excessively and unnecessarily during frequent dispensing operations where the amount of CO2 absorbed from the headspace of the bowl chamber by the liquid in the reservoir through its surface is likely to be acceptable.

Also it is unnecessary for the control means to be actuated during each dormant period in a system where, for example, the bowl chamber comprises a lower chamber part that forms a main reservoir (from which carbonated liquid is drawn on demand) which communicates at its upper end through a length of relatively small diameter conduiting (which length may be considerable) with an upper chamber part into which the liquid and CO2 are introduced so that the reservoir of carbonated liquid fills the lower chamber part and a predetermined part length of the small diameter conduiting. With this arrangement and during normal dispensing the surface of the carbonated liquid in the reservoir may rise and fall in the small diameter conduiting so that for the majority of the times when the system is dormant only the small surface area of the carbonated liquid in the conduiting is presented to the CO2 in the headspace. In the event that the surface of the carbonated liquid should enter the lower chamber part to present a large surface area to the CO2 headspace when the system is dormant, the control means can be actuated, for example in response to signals from float or level switches, to cause liquid to be admitted into the bowl chamber sufficient to raise the level of the reservoir as necessary within the small diameter conduiting so that it again presents a small surface area to the headspace.

As an addition or alternative to the aforementioned, the control means may comprise a pressure controller by which, as necessary and during periods when the system is dormant, pressure of CO2 gas in the headspace of the bowl chamber is reduced. This reduction in CO2 pressure may be achieved by the control means venting gas from the headspace whilst simultaneously ensuring that CO2 gas from its pressurised source is closed to communication with the headspace. This reduction in CO2 pressure may also be achieved by enlarging the volume of the headspace, for example by comprising in that headspace a chamber of a piston and cylinder device so that such chamber is expanded by a movement of the piston under control of the control means which again ensures that the supply of pressurised CO2 to the headspace is closed during expansion of the piston chamber.

Whilst it is preferred that the rate at which carbonated liquid is formed in the bowl chamber is the same as the rate at which carbonated liquid is drawn from the bowl chamber for dispensing as carbonated beverage, it is appreciated that in practice and similarly to conventional systems the present invention will usually provide controls whereby liquid is introduced automatically into the bowl chamber when the reservoir of carbonated liquid falls below a predetermined volume following a dispensing operation to increase the volume of the reservoir as considered appropriate. As a consequence, the volume of liquid in the reservoir may vary considerably, particularly if that volume is increased by the control means, for example to reduce the surface area of the liquid in the reservoir that is exposed to the headspace. Where the headspace is maintained at a predetermined pressure of CO2, (say 3.5 bar as aforementioned) it will be appreciated that as the volume of carbonated liquid in the reservoir increases, the pressure of gas in the closed headspace will increase due to its compression by the liquid of the reservoir. To alleviate the effect of such an increase in pressure of the gas in the headspace (and thereby an increase in the rate at which CO2 may be absorbed from the headspace into the carbonated liquid in the reservoir) it is preferred that the volume of carbonated liquid which is admitted to, or displaced from, the reservoir to vary the reservoir between its intended maximum and minimum depths or volumes in the bowl chamber is less, preferably considerably less, than the volume of the headspace. By providing the headspace with a volume considerably greater than that of the volume of carbonated liquid which has to be admitted to the bowl chamber for the reservoir to rise from its minimum to its maximum level, the increase in pressure in the headspace which results from the rise in carbonated liquid level in the bowl chamber may be so small that it can be disregarded as a factor in determining the rate at which CO2 from the headspace is absorbed by the carbonated liquid in the reservoir through its surface. The headspace may be defined by an upper part of the bowl chamber. However to alleviate use of an inconveniently large carbonation bowl structure, the headspace may be formed by an upper part of the bowl chamber and an auxiliary chamber which is remote from the carbonation bowl but in communication with the upper part of the bowl chamber. If required, the auxiliary chamber may be in constant communication with the upper part of the bowl chamber or such communication may be effected through a closure valve which is open or closed by the control means as required to vary the volume of the headspace, for example to increase such volume during dormant periods of the system. Alternatively, a constant pressure means may be provided which reacts, preferably automatically, by venting or otherwise so that a constant, or near constant, pressure of CO2 is maintained in the headspace of the bowl chamber independently of changes in level or volume of liquid in the reservoir.

The liquid for the beverage will usually be introduced to the bowl chamber as a jet, spray or as a mist of which the latter is preferred to increase the surface area of the liquid that is exposed to the CO2 in the headspace and thereby increase the rate at which the liquid becomes carbonated.

DRAWINGS

One embodiment of a beverage dispensing system will now be described, by way of example only, with reference to the accompanying illustrative drawings, in which:

FIG. 1 shows the system schematically and provides for carbonated beverage to be dispensed resulting from carbonated water post-mixed with a syrup or concentrate of the beverage, and FIG. 2 shows a modified form of carbonation bowl suitable for use in the system of FIG. 1.

DETAILED DESCRIPTION OF DRAWINGS

Figure 2:
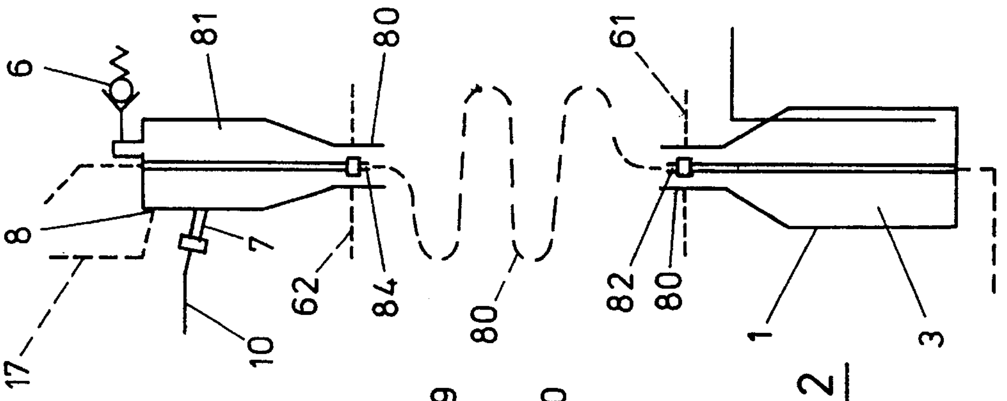
Figure 1:
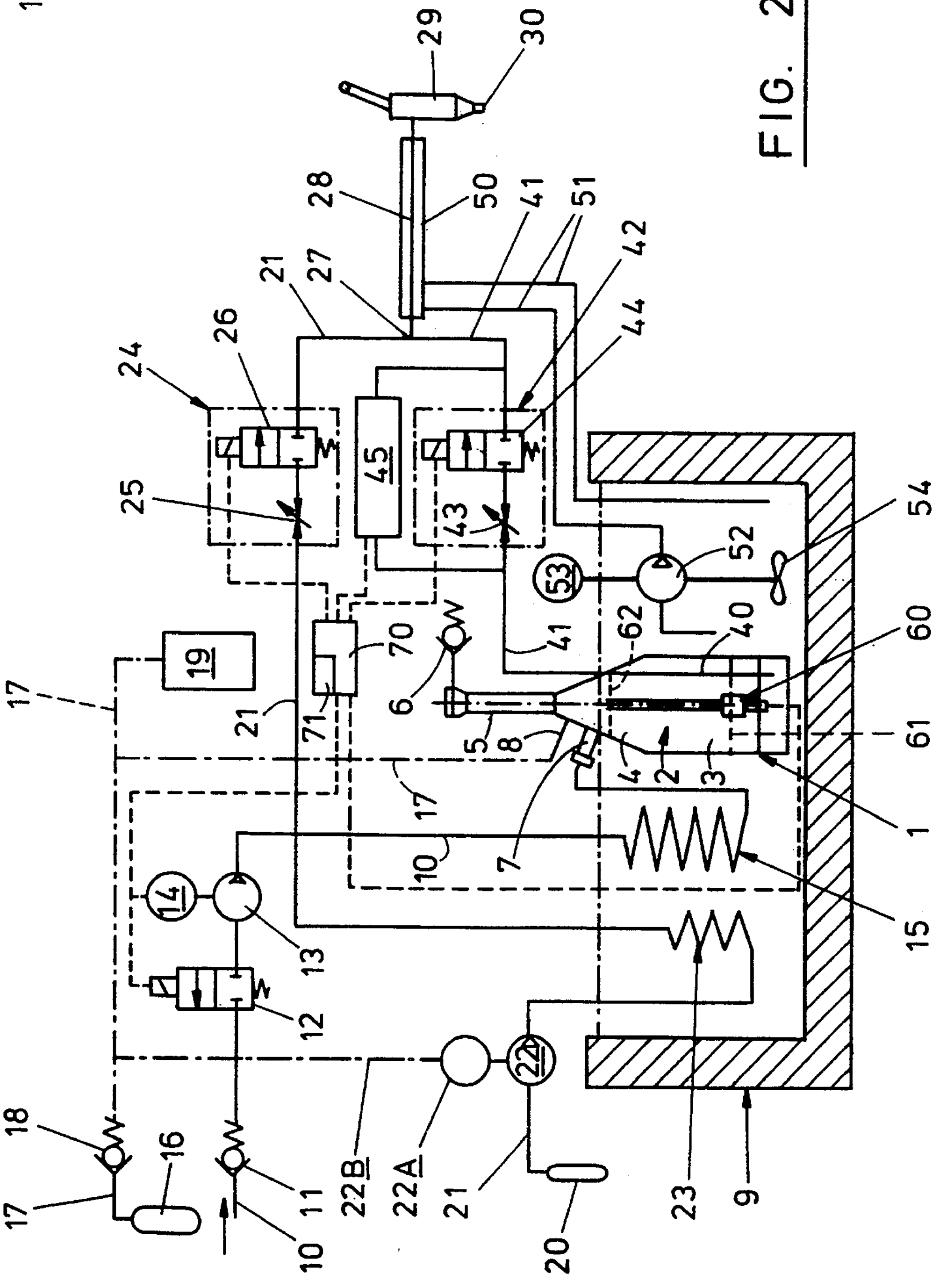

The dispensing system of the present example will be considered for the dispensing of fermented non-alcoholic lager such as that sold under the Trade Mark KALIBER by the Guinness Group of Companies where it is desirable that consistency is maintained in the amount of CO2 that is absorbed in the beverage for dispensing. Typically the CO2 content will be in the range 4 to 4.4 grammes per liter of which 4.2 grammes per liter is preferred. It will be appreciated however that the system may be used with other beverages that may require a different absorption content of CO2 where such absorption content is below the maximum CO2 absorption content possible for the beverage. The system has a carbonation bowl 1 having a bowl chamber 2, a lower part 3 of which is cylindrical with its axis vertical and communicates with an upper part 4 of frusto conical shape. The bowl part 4 is coaxial with the lower part 3 and its side wall converges to reduce the diameter of the bowl chamber 2 as the side thereof approaches the top of the bowl 1. The upper end of the frusto conical part 4 communicates with a vertical tube 5 of the bowl having a gas pressure relief valve 6. Located in the frusto conical wall of the upper part 4 of the bowl 1 is an injection nozzle 7 through which water is introduced into the bowl chamber 2 as a mist to be carbonated in a CO2 atmosphere maintained in the chamber 2. The frusto conical wall of the bowl also has an inlet 8 through which CO2 is introduced into the bowl chamber at approximately 3.5 bar. The carbonation bowl 1 is, predominantly, immersed in an ice bath 9 to maintain a substantially constant low temperature, typically 4° C. (but preferably in the range 2° C. to 10° C.) of the bowl and its contents.

Water is supplied to the nozzle 7 through a conduit 10 and successively by way of a non-return valve 11, an open/closed solenoid control valve 12, a water pump 13 driven by an electric motor 14 and a water cooling coil 15 in the ice bath 9.

Supply of CO2 to the inlet 8 is provided by a source 16 of CO2 that is pressure regulated to 3.5 bar and by way of a conduit 17 including a non return valve 18 and an auxiliary chamber 19 that is in constant communication with the bowl chamber upper part 4. The lager beverage is derived from a syrup or concentrate thereof, a cartridge or other bulk supply 20 of which is connected to a conduit 21 of the system for the syrup to be drawn by a pump 22 and pass successively by way of a syrup cooling coil 23 in the ice bath and a syrup metering unit 24 (comprising a variable restrictor 25 and a solenoid controlled open/closed valve 26) to a mixing junction 27. A delivery pipe 28 extends from the mixing junction 27 to a dispense tap 29 that includes an open/closed valve and a dispensing nozzle 30. The pump 22 for the syrup is driven by a motor 22A which is conveniently operated by CO2 under pressure derived through conduit 22B from the CO2 supply line 17.

Carbonated water formed in the bowl chamber 2 provides a reservoir in that chamber and is drawn from the chamber 2 through a dip tube 40 communicating with a conduit 41 in which carbonated water flows by way of a water metering unit 42 (comprising a variable restrictor 43 and an open/closed solenoid operated valve 44) to the mixing junction 27. Connected in parallel with and across the water metering unit 42 is a differential liquid pressure switch 45.

The dispensing pipe 28 is provided with an insulating jacket 50 that is cooled by water circulating through conduits 51 and supplied by a pump 52 driven by an electric motor 53. The pump 52 draws water from the ice bath 9 to circulate it through the cooling jacket 50 (conventionally known as "Python cooling") for return to the bath 9. The motor 53 additionally drives a propellor 54 for agitating the ice bath.

The differential switch 45 for the water metering unit 42 is responsive to liquid pressure differentials between liquid pressure upstream of the unit 42 (that is water pressure in the conduit 41 between the unit 42 and the bowl chamber 2) and liquid pressure downstream of the unit 42 (that is in the conduit 41 between the unit 42 and the mixing junction 27). When a large difference between high pressure upstream and low pressure downstream of the water metering unit 42 is detected by the switch 45, that switch reacts to provide a signal which causes the solenoid of the valve 44 to open that valve and also provides a signal which causes the solenoid of valve 26 of the syrup metering unit 24 to open that valve 26; when the switch 45 detects a small difference in water pressure between that upstream and that downstream of the water metering unit 42, the switch 45 develops signals which cause the solenoids of the valve 26 and 24 to close those valves.

Provided in the bowl chamber 2 is a level switch 60 which rises or falls on a vertical guide in that chamber so that such rise or fall is indicative of volume of carbonated water in the bowl chamber between a minimum volume or reservoir level 61 and a maximum volume or reservoir level 62. Signals from the level switch 60 provide an input to a microprocessor 70 which incorporates a timer 71. The microprocessor additionally receives signals from the differential pressure switch 45 and provides control signals for operation of the water pump motor 14 and the solenoid valve 12, 26 and 42. The signals from the switch 45 to the microprocessor 70 effectively advise when the system is dormant (by the valve 44 being closed so that no beverage is dispensed) and when the system is active for dispensing beverage with the valve 44 open.

During normal operation of the beverage dispensing system, the bowl chamber 2 will contain a reservoir of carbonated water with the level of such water being between the minimum and maximum levels 61 and 62. In addition, there will be a headspace above the surface of the carbonated water; the headspace containing CO2 at 3.5 bar will consist, substantially, of the volume of the bowl chamber 2 above the surface of the carbonated water together with the volume of the auxiliary chamber 19. The overall volume of the headspace thus provided is greater, preferably far greater than, the volume of carbonated water that has to be admitted to the bowl chamber 2 to raise the water level in that chamber from its minimum height 61 to its maximum height 62.

When carbonated beverage is to be dispensed from the nozzle 30 and with the valves 26 and 44 in a closed condition, the tap 29 is adjusted to open the valve therein and such adjustment creates a low water pressure on the downstream side of the switch 45 whilst the upstream side of that switch detects high water pressure in the conduit 41 that is derived from the 3.5 bar pressure in the bowl chamber 2. As a consequence, the switch 45 controls, through the microprocessor 70, the solenoids of valves 26 and 44 to open the conduits 21 and 41 to liquid flow therethrough. In addition the water pump 13 is actuated and the valve 12 is opened through the control of the microprocessor 70. As a consequence, and simultaneously, carbonated water is displaced from the bowl chamber 2 by the pressure of CO2 gas in the headspace of that chamber for such carbonated water to be supplied to the mixer junction 27 and cooled beverage syrup is delivered by pump 22 through the conduit 21 to the mixer junction 27 for the carbonated water to be mixed with the beverage syrup and delivered through the dispensing pipe 28 in a cooled condition and dispensed as carbonated beverage through the nozzle 30. The proportions in which the carbonated water from the conduit 41 and the beverage syrup from the conduit 21 are mixed at the junction 27 and along the pipe 28 may be determined by appropriate adjustment of the restrictors 25 and 43 in the metering units 24 and 42 respectively. To alleviate back flow of the liquids in the conduits 21 and 41 from the junction 27 it will be appreciated that the system should provide for equal pressures at the junction 27 of the liquids in the conduits 21 and 41. For so long as the dispense tap 29 is open and carbonated beverage is dispensed, CO2 gas at 3.5 bar is maintained, through the inlet 8, in the headspace in the bowl chamber 2 whilst water is admitted to the bowl chamber 2 as a mist from the nozzle 7 to replenish the reservoir.

At the end of a beverage dispensing operation the valve of the dispense tap 29 is closed causing high pressure to develop in the conduit 41 downstream of the water metering unit 42. A relatively small difference thereby develops in the water pressure between that immediately upstream and that immediately downstream of the water metering unit 42 in the conduit 41. As a result of this relatively small water pressure differential, the switch 45 signals the microprocessor 70 to actuate the solenoids of valves 26 and 44 in the syrup and water metering units 24 and 42 respectively to close those valves 26 and 44 (and possibly also to de-energise the water pump motor 14 and close the water control valve 12 if the water level switch 60 indicates that the carbonated water in the reservoir is greater than its minimum volume level 61). The effect of closing valves 26 and 44 in the syrup and carbonated water delivery lines ensures that there is no back flow through those lines.

During beverage dispensing the rate at which carbonated water is displaced from the bowl chamber 3 may be the same as that at which water is admitted to the bowl chamber for carbonation so that the level of the carbonated water reservoir in the bowl chamber 2 is maintained substantially constant. However, in practice it is likely that carbonated water will be drawn from the bowl chamber 2 during a beverage dispensing operation at a greater rate than that at which water is admitted to the bowl chamber so that the carbonated water level in the bowl chamber drops below the minimum level 61. In such circumstances and at the end of a dispensing operation when the tap 29 is closed, the level switch 60 signals the microprocessor 70 to continue operation of the water pump 13 with the water valve 12 open and thereby the introduction of water through the nozzle 8 continues until the water level switch 60 signals that the carbonated water in the reservoir attains its maximum volume level 62 following which the microprocessor de-energises the motor pump 14 and closes the valve 12.

With the system as above described, the rate at which water is admitted through the nozzle 7 as a mist into the bowl chamber 2 is determined so that the water in the reservoir of the bowl chamber contains approximately 4.2 grammes of CO2 per liter which is that preferred for the lager beverage as dispensed. However, because the carbonated water is drawn from the reservoir in the bowl chamber intermittently at periods determined by opening and closing of the dispense tap 29, there will be periods during which the system is dormant so that the carbonated water in the reservoir is static and can continue to absorb, through its surface area, CO2 from the headspace in the bowl chamber. Such absorption by the carbonated water in the reservoir may take the carbonation level above that which is predetermined as a desirable maximum level for beverage as dispensed (in the present example 4.4 grammes of CO2 per liter)—this continued absorption of CO2 by the carbonated water is particularly discernible when the system is dormant or unused for long periods, say overnight or over weekends. To alleviate this problem of over carbonation of the water in the reservoir during dormant periods of the system, following a predetermined time interval at the end of a dispensing operation when the dispense tap is closed (say two minutes from such closure) the timer 71 signals the microprocessor 70 to cause the water valve 12 to be opened and the water pump 13 to be actuated so that cooled water is admitted through the nozzle 7 into the bowl chamber 2 for the volume of carbonated water in the reservoir to be increased. This increase in volume of the reservoir causes the surface of that reservoir to rise into the tapered upper part 4 of the bowl chamber and carry with it the level switch 60. As the surface of the reservoir rises in the bowl chamber part 4 its area progressively decreases within that chamber part until the level switch 60 indicates the maximum volume/depth 62 for the carbonated water in the reservoir and signals the microprocessor 70 to stop the water pump 13 and close the valve 12. Typically the diameter of the cylindrical lower part 3 of the bowl chamber will be 9 centimeters whilst the diameter of the surface area of the reservoir in the upper frusto conical part 4 of the bowl chamber at the maximum level 62 may be 2.5 centimeters. From this it will be appreciated that the surface area of the carbonated water in contact with the CO2 under pressure in the headspace of the bowl chamber is considerably less when the reservoir is at its maximum depth 62 as compared with when the reservoir is at its minimum depth 61. The rate at which CO2 from the headspace in the bowl chamber is absorbed by the carbonated water in the reservoir is proportional to the surface area of that reservoir which communicates with the bowl chamber headspace. Consequently by reducing the surface area of the reservoir by raising the level thereof it may be ensured that the further CO2 that is taken up by the carbonated water during prolonged periods as may reasonably be expected when the dispensing system is dormant (say twelve hours overnight) does not cause the concentration of CO2 absorbed in the water to exceed a predetermined maximum such concentration as considered appropriate for dispensing of the beverage. It will be realised that the appropriate difference in the aforementioned diameters (or differences in the surface area of carbonated water that is in contact with the CO2 in the headspace) and the associated CO2 pressure in the headspace may easily be determined and varied to suit the particular characteristics required for a beverage that is to be dispensed. Following a prolonged period when the system is dormant and the dispense tap 29 is opened the carbonated water reservoir in the bowl chamber 2 may progressively fall from its level 62 until such time as the system may again becomes dormant for a prolonged period when the timer 71 can again react to cause the carbonated water level in the reservoir to rise to its maximum depth 62.

As the carbonated water reservoir in the bowl chamber rises to its maximum depth 62, the CO2 gas in the headspace will be compressed resulting in an increase of CO2 pressure above the 3.5 bar and consequently an increase in the rate at which the water in the bowl chamber 2 will absorb the CO2. However, because the volume of the closed headspace formed, predominantly, by the auxiliary chamber 19 and the part of the headspace in the carbonation bowl 1 is greater than the increase in volume exhibited by the reservoir, the increase in pressure of the gas in the headspace may be sufficiently small to be disregarded in the practical effect which it has on the rate at which CO2 from the headspace is picked up by the carbonated water in the reservoir.

The relief valve 6 at the upper end of the carbonation bowl chamber 2 is set to release gas pressure from the headspace of the that chamber when it exceeds, say 4 bar, and provides a fail-safe in the event that the control system fails to stop the water pump 13 and water continues to flow into the bowl chamber to increase the gas pressure of the headspace. If required, the relief valve 6 when actuated can also provide an additional safeguard to stop the water pump 13 and closing the valve 12.

In the modification of the system shown in FIG. 2, the carbonation bowl 1 has its lower part 3 tapering at its upper end to communicate with a lower one end of a small diameter bore conduit 80 which is of considerable length (and conveniently of serpentine form as indicated by the broken line). The other, upper, end of the conduit 80 communicates with the bottom of an upper bowl chamber part 81 into which is admitted water through the nozzle 7 and CO2 at 3.5 bar pressure through the inlet 8. Provided in the lower part 3 of the bowl chamber is a reservoir level switch 82 which rises to or falls from a minimum reservoir level 61 that is located in the lower end part length of the conduit 80. Provided in the upper end part length of conduit 80 is a second reservoir level switch 84 which determines the maximum reservoir level 62 located in the conduit 80. The level switches 82 and 84 provide signals to the microprocessor 70 whilst the diameter of the bore of the conduit 80 is considerably less than the diameter of the reservoir part 3, say 2.5 centimeters as compared with 9 centimeters. The volume of the carbonated water reservoir in the FIG. 2 modification may vary up to the maximum level 62 in the conduit 80. The volume of carbonated water content in the conduit 80 between the levels 61 and 62 is preferably greater than the volume of water which is likely to be "lost" from the volume of the reservoir during several dispensing operations. Consequently following several dispensing operations it is possible that the level of the reservoir of carbonated water in the bowl 1 does not fall below the minimum level 61 in the conduit 80. Provided that the carbonated water reservoir does not fall substantially below the level 61 it will be appreciated that the relatively small surface area of the reservoir in the conduit 80 will be exposed to the CO2 in the headspace constituted by the upper part length of the conduit 80 and the upper bowl chamber part 81 and of the conduit 80 and the upper bowl chamber part 81 (and the auxiliary chamber 19 if provided) so even after prolonged periods with the dispensing system dormant there will be no necessity to raise the level of the reservoir—thereby conserving energy and prolonging the working life of the components in the system. In the event that the carbonated water reservoir falls below the level 61 as may occur during frequent or prolonged beverage dispensing operations, the switch 82 signals the microprocessor 70 of the decrease in the volume of the reservoir. Following from this and when the dispense tap 29 is closed, water continues to be admitted through the nozzle 7 to the upper part of the bowl chamber 81 causing the level of the reservoir to rise and fill the lower part 3 of the bowl chamber and the major part length of the conduit 80 until the switch 82 is actuated to signal the microprocessor 70 when the reservoir attains its maximum level 62 in the conduit 80 so that the microprocessor stops the water pump 13 and closes the valve 12 until the dispense tap is opened again for further beverage dispensing. With the modification of FIG. 2 it will be realised that the timer 71 can be omitted.

In a typical example, the volume of liquid for the reservoir that is displaced between its minimum level 61 and its maximum level 62 will be in the range 500 cc to 2000 cc, the rate at which carbonated water is drawn off from the reservoir during dispensing of beverage through the tap 29 will be in the range of 40 cc to 70 cc/second and the rate at which water is introduced through the nozzle 7 to the bowl chamber will be in the range of 40 cc to 70 cc/second.

We claim:

1. A beverage dispensing system comprising a carbonation bowl chamber into which carbon dioxide (CO2) under pressure is introduced to provide a CO2 atmosphere and into which atmosphere and bowl chamber liquid for the beverage is introduced intermittently for carbonation of the liquid to a CO2 absorption content less than a predetermined CO2 absorption content for said liquid, carbonated liquid thereby provided in the bowl chamber forming a reservoir from which the carbonated liquid is drawn on demand for dispensing carbonated beverage and further forming a headspace containing CO2 under pressure from which headspace the reservoir of carbonated liquid absorbs further CO2, and wherein control means is provided for controlling the absorption, by the liquid in the reservoir, of CO2 from said headspace during dormant periods of the system when carbonated liquid is not drawn from the bowl chamber to maintain, during said dormant periods, the carbonated liquid in the reservoir with a CO2 absorption content less than said predetermined absorption content.

2. A system as claimed in claim 1 in which the control means reduces, during said dormant periods, the surface area of the carbonated liquid in the reservoir that is exposed to the CO2 in the headspace.

3. A system as claimed in claim 2 in which the bowl chamber has a horizontal cross sectional area that reduces as it approaches an upper part of the bowl chamber and during said dormant periods liquid is introduced into the bowl chamber to increase the volume of the reservoir and cause its surface to move upwardly within the reducing cross sectional area of the bowl chamber and thereby reduce the surface area of the reservoir that is exposed to the CO2 in the headspace.

4. A system as claimed in claim 3 in which the horizontal cross sectional area of the bowl chamber is reduced by tapering the upper part of that chamber to converge progressively as it approaches its top.

5. A system as claimed in claim 3 in which the bowl chamber has a substantially cylindrical lower part having its axis extending upwardly and which lower part communicates with a frusto conical upper part within which upper part the surface of the reservoir is raised to reduce the area thereof that is exposed to the CO2 in the headspace.

6. A system as claimed in claim 1 in which the control means comprises a pressure controller by which, during said dormant periods, pressure of gas in the headspace is reduced.

7. A system as claimed in claim 6 in which the pressure of gas in the headspace is reduced by enlarging the volume of the headspace during said dormant periods.

8. A system as claimed in claim 1 in which during said dormant periods the control means causes liquid to be introduced into the bowl chamber when said reservoir of carbonated liquid falls below a predetermined volume as a result of dispensing of the beverage and controls said introduction to provide a predetermined volume of the liquid in the reservoir.

9. A system as claimed in claim 1 and comprising a time control which actuates said control means to maintain the CO2 absorption content of the liquid in the bowl chamber less than the predetermined absorption content following a predetermined period commencing from when the system becomes dormant.

10. A system as claimed in claim 1 in which the liquid in the reservoir is controlled to be variable between maximum and minimum volumes and the volume of liquid drawn from or admitted to the bowl chamber to effect said variation between maximum and minimum volumes is less than the volume of the headspace.

11. A system as claimed in claim 1 in which the headspace is defined by an upper part of the bowl chamber.

12. A system as claimed in claim 1 in which the headspace is formed by an upper part of the bowl chamber and an auxiliary chamber in communication therewith.

13. A system as claimed in claim 1 in which the liquid is introduced into the bowl chamber as a mist.

14. A system as claimed in claim 1 in which the liquid introduced into the bowl chamber comprises, substantially, un-carbonated beverage.

15. A system as claimed in claim 14 in which said un-carbonated beverage is derived from a syrup or concentrate of said beverage which is pre-mixed with water for admission to the bowl chamber.

16. A system as claimed in claim 1 in which the liquid introduced into the bowl chamber is, substantially, water and carbonated water drawn from the reservoir is mixed with a syrup or concentrate of the beverage for dispensing as the carbonated beverage.

17. A system as claimed in claim 1 in which beverage is dispensed from the system through a closure valve and when said closure valve is opened liquid is drawn from the bowl chamber by displacement of said liquid under pressure from gas in the headspace.

18. A system as claimed in claim 17 in which liquid drawn from the bowl chamber flows to the closure valve by way of a control valve and a pressure differential switch is responsive to differentials in carbonated liquid pressure immediately upstream and downstream of said control valve, the switch acting to close liquid flow through said control valve in response to development of a relatively small liquid pressure differential between pressure upstream and pressure downstream of the control valve caused when the closure valve is closed and acting to open liquid flow through said control valve in response to development of a relatively large liquid pressure differential between pressure upstream and pressure downstream of the control valve caused when the closure valve is opened.

19. A system as claimed in claim 18 in which when the closure valve is open for dispensing, carbonated water from the bowl chamber flows through said control valve prior to that water being mixed with a beverage syrup or concentrate for dispensing as the carbonated beverage.

20. A system as claimed in claim 1 in which means is provided for maintaining the bowl chamber at a substantially constant temperature.

21. A system as claimed in claim 20 in which said temperature is in the range 2° C. to 10° C., preferably 4° C.

* * * * *